Patented Aug. 30, 1949

2,480,746

UNITED STATES PATENT OFFICE 2,480,746

8,9-BENZTHIOPHANTHRONE

Henry R. Lee and Viktor Weinmayr, Pitman, N. J., assignors to E. I. du Pont de Nemours & Company, Wilmington, Del., a corporation of Delaware No Drawing. Application April 22, 1947, Serial No. 743,202

1 Claim. (Cl. 260—329)

This invention relates to new benzthiophanthrone compounds, and more particularly to the preparation of the new 8,9-benzthiophanthrone of the formula:

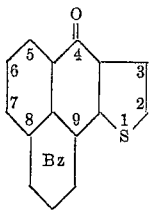

As disclosed by Scholl and Seer in Ann. 394, 131, 175 (1912), the 4,5-benzthiophanthrone was prepared in an impure state. This compound, according to Zentralblatt nomenclature, was then designated 3,4-benzthiophanthrone-8. This known benzthiophanthrone was prepared by fusing alpha-thienyl-1-naphthyl ketone with anhydrous aluminum chloride. A repetition of the process disclosed by Scholl and Seer gives the 4,5-benzthiophanthrone, which melts at 215°–217° C., in very poor yields.

It is an object of this invention to prepare 8,9-benzthiophanthrone as a valuable intermediate for the preparation of dyestuffs and other compounds, and to provide a process for producing this new intermediate in sufficiently good yields to make it of practical use in the synthesis of dyes.

We have found that the 8,9-benzthiophanthrone may be obtained in good yields by reducing thiophanthraquinone in sulfuric acid and simultaneously condensing it with glycerine. This process we have found gives a produce free from the isomeric compound produced by Scholl and Seer and gives yields which make this new compound of value as an intermediate in the preparation of dyestuffs.

The following example is given to illustrate the preferred method for the preparation of the 8,9-benzthiophanthrone.

Example 107 parts of crystallized thiophanthraquinone are dissolved in 825 parts of 95% sulfuric acid. 131 parts of water, containing 2 parts of copper sulfate, are added gradually to reduce the acidity of the reaction mass to about 82%–83%. The charge is then heated to 110° C. and 95 parts of glycerine and 49 parts of fine iron filings are simultaneously, and as uniformly as possible, added over a period of about three hours, while maintaining the reaction temperature at 110°–115° C. After stirring at 115° C. (±3° C.) for an additional one to two hours, the condensation is complete, as shown by the absence of vattable starting material.

The charge is poured into about 3000 parts of cold water and the precipitated crude 8,9-benzthiophanthrone is filtered, washed acid-free and dried. The crude product (about 130 parts) is extracted with benzene in a Soxhlet apparatus and the extract is evaporated to dryness. 77 parts of bright yellow 8,9-benzthiophanthrone, melting at 139°–140° C. are obtained, equal to a yield of 65.3%, based on the thiophanthraquinone employed. Upon crystallization from 50 times its weight of a high boiling petroleum ether (B. P. 120° C.), the benzthiophanthrone is obtained as deep yellow crystals with a melting point of 140° C. It is soluble in concentrated sulfuric acid and in 36% hydrochloric acid with a deep red color, and is distillable. A mixed melting point with the 4,5-benzthiophanthrone prepared from 2-thienyl-1-naphthyl ketone shows a decided depression.

Oxidation with chromic acid in acetic acid by the method used by A. G. Perkin for the oxidation of benzanthrone gives thiophanthraquinone-8-carboxylic acid having a melting point of 283°–284° C., which is different from the thiophanthraquinone carboxylic acid disclosed in our co-pending application Serial No. 736,125, now Patent 2,472,133.

While the 4,5-benzthiophanthrone is obtainable only in very low yields, the 8,9-benzthiophanthrone may be obtained in yields which make the compound of practical interest for further synthesis.

Since the reaction is found to proceed very similar to the reaction employed in the preparation of benzanthrone, it will be obvious that any of the conditions employed in the preparation of benzanthrone from anthraquinone and glycerine will be suitable for the preparation of this new benzthiophanthrone.

We claim:
8,9-benzthiophanthrone.

HENRY R. LEE.
VIKTOR WEINMAYR.

REFERENCES CITED

The following references are of record in the file of this patent:

UNITED STATES PATENTS

| Number | Name | Date |
|---|---|---|
| 1,626,392 | Caswell | Apr. 26, 1927 |

OTHER REFERENCES

Scholl and Seer, Ann. 394, 130, 131, 175 (1912).
Richter, "Organic Chemistry," 649–50, Wiley, N. Y., 1938.